United States Patent [19]

Laude

[11] Patent Number: 5,838,848
[45] Date of Patent: Nov. 17, 1998

[54] N×N WAVELENGTH ROUTER, OPTICAL ROUTING METHOD AND ASSOCIATED COMMUNICATION NETWORK

[75] Inventor: Jean-Pierre Laude, Saclas, France

[73] Assignee: Instruments, S.A., Paris, France

[21] Appl. No.: 780,357

[22] Filed: Jan. 8, 1997

[30] Foreign Application Priority Data

Jan. 9, 1996 [FR] France .................................. 96 00170
Feb. 28, 1996 [FR] France .................................. 96 02496

[51] Int. Cl.$^6$ ...................................................... G02B 6/28
[52] U.S. Cl. ................................ 385/24; 385/37; 359/117
[58] Field of Search ................................ 385/15, 16, 18, 385/20, 21, 24, 37; 359/117

[56] References Cited

U.S. PATENT DOCUMENTS 5,657,406  8/1997  Ball ............................................ 385/24
5,668,652  9/1997  Hashomoto et al. ....................... 385/24

FOREIGN PATENT DOCUMENTS

0592331 A1  4/1994  European Pat. Off. .

OTHER PUBLICATIONS

Photonics in Switching, vol. 16, Mar. 15, 1993, Palm Springs, California, pp. 196–198, SHARONY: "Broadcast and Switch"—A New Class of WDM Networks for High Switching–Speed, High Connectivity Applications.

IEEE Transactions on Parallel and Distributed Systems, vol. 1, No. 2, May, 1990, New York, New York, pp. 47–53, Fujiwara: "Line Capacity Expansion Schemes in Photonic Switching".

International Switching Symposium, vol. 3, May 28, 1990, Stockholm, Sweden, pp. 21–26, Hill et al: "A Distributed Wavelength Switching Architecture for the TPON Local Network".

Globecom '92, vol. 3, Dec. 6, 1992, Orlando, Florida, pp. 1593–1599, HAAS: "The 'Staggering Switch': An 'Almost–All' Optical Packet Switch".

*Primary Examiner*—John Ngo
*Attorney, Agent, or Firm*—Nikaido Marmelstein Murray & Oram, LLP

[57] ABSTRACT

An N×N wavelength router (1) includes n m×m couplers (10, 15, 20, 25), N being equal to n×m, and the N inputs (11, 12, 16, 17, 21, 22, 26, 27) of the couplers being the inputs (E1–E8) of the N×N router. The N×N router also includes m n×n routers (30, 40) capable of switching an optical signal having a wavelength, from any one of its n inputs (31–34, 41–44) to any one of its n outputs (35–38, 45–48), according to the wavelength of the signal. The inputs of the n×n routers are connected to the outputs of the m×m couplers, and the outputs of the n×n routers are the outputs (S1–S8) of the N×N routers. The transmission spectra of the n×n routers have the form of a series of peaks, each of the series being different one from another.

14 Claims, 4 Drawing Sheets

N×N WAVELENGTH ROUTER, OPTICAL ROUTING METHOD AND ASSOCIATED COMMUNICATION NETWORK

FIELD OF THE INVENTION

This invention relates to an N×N wavelength router, as well as an associated routing method, more particularly intended for a communication network.

BACKGROUND OF THE INVENTION

Important developments in teletransmission by an optical route are leading to each user being connected to a transmission centre or a relay centre by means of optical transmission fibres provided at each of their ends, with an optical component intended to connect the modulated light transmitter to the fibre so that the light enters it, or at the other end, to collect the light in order to direct it to a detector which will decode the optical signal in order to transform it into an electrical or electronic signal which can be used by a normal receiver.

The telecommunication networks obtained in this way make it necessary to carry out a large number of switching operations via complex devices of the optical self-switching type.

In order to obtain such an optical self-switching unit, specific components with N inputs and N outputs have been developed, capable of connecting any one input to any one output by adjustment of the wavelength. This component, called an N×N wavelength router or WDM (Wavelength Division Multiplexer) usually comprises N input diffracting elements connected, respectively to the inputs, and N output diffracting elements positioned facing the input diffracting elements and connected, respectively, to the outputs. Each of the input diffracting elements is capable of producing, for a given signal transmitted at a wavelength, an image located in a focal plane corresponding to any one of the output diffracting elements. The selection of the output element is subordinated to the wavelength of the signal.

Thus, a transmission wavelength is associated with each input fibre—output fibre pair. The overall transmission spectrum of the whole of the N×N router has thus the form of a series of peaks with the peaks located at said wavelengths. For the identical diffracting elements located at equal intervals in an input line and an output line, 2N−1 distinct wavelengths are used in the transmission spectrum.

A disadvantage of these traditional routers is their size and complexity, 2N diffracting elements being required.

Furthermore, the wavelength ranges situated between the peaks are lost areas. Given that the usable spectral band is restricted, the result is limitation of the number of transmission wavelengths. The number of users possible is therefore considerably restricted. To give an example, for a total spectral band limited to 30 nm, and the spacing between two transmission wavelengths being 1 nm, the number of transmission wavelengths cannot exceed 30, which restricts the number of users to about fifteen.

On the other hand the peaks in the transmission spectrum have a Full Width Half-Maximum (or FWHM) that is usually low compared with the spacing between transmission wavelengths which makes the selection of one emission wavelength delicate since positioning in a peak of the spectrum requires great precision.

In order to reduce the areas lost and to increase the useful wavelength area, one means consists of bringing the core of the fibres closer. The ratio R of the full width half-maximum of the peaks to their spacing, in fact increases with the ratio of the core diameter of the fibres to their distance. Thus, the ratio R can reach a value of 0.4 when the fibres, having cores of 10 $\mu$m diameter are spaced successively at 22 $\mu$m.

However, bringing the fibres closer in such a way has technical limitations and, in addition, brings about optical cross-talk, light passing directly from a fibre core to another neighbour.

So as to increase the capacity of the routers, it has been proposed to associate several elementary routers. In existing devices, the routers are connected at input to achromatic couplers through the use of time division, multiplexing and demultiplexing units. The inputs of each of the couplers can thereby be connected to the inputs of each of the routers by means of an interconnection network. The capacity of the router thus obtained is substantially increased with respect to that of elementary routers, the total number of users being the sum of the users provided for by the different elementary routers.

However, such a network produces large losses. Furthermore, it involves the implementation of complex procedures so as to carry out the time division multiplexing. In addition, the problem, previously mentioned, of selecting the wavelengths remains.

In the reports of Photonics in Switching, vol. 16, 15th Mar. 1993, Palm Springs US, pp. 196–198, an architecture using star couplers and wavelength selective switches has been proposed by J. Sharony. The wavelength selective switches or WSS used are made up of separators, WDM demultiplexers and photonic switches (FIG. 2). Each of them receives multiplexed optical signals coming from each of the star couplers and selects appropriate outputs by using its demultiplexers.

SUMMARY OF THE INVENTION

This invention aims an N×N wavelength router applicable to a large number of users, that involves slight losses and is simple to produce and to use.

The aim of this invention is also such an N×N router that avoids any optical cross-talk problems, and has a high ratio of full width half-maximum to spacing distance between transmission wavelengths.

This invention is also directed towards an optical routing method that is easy to implement and avoids interference between signals.

An objective of this invention is also a communication network based on optical means, applicable to a large number of users, reliable, involving small energy losses, and simple to produce and to use.

To this end, the invention relates to an N×N wavelength router comprising N inputs and N outputs, provided to transmit optical signals each having a wavelength, from the inputs to the outputs. The N×N router also comprises switching means capable of directing each of the optical signals from any one of the N inputs to any one of the N outputs according to the wavelength of the signal.

The N×N router is characterized in that the switching means comprise:

n m×m couplers, each having m inputs and m outputs, N being equal to n×m and the N inputs of the n m×m couplers being the inputs of the N×N router, m n×n routers each having n inputs and n outputs, each of the n inputs being connected to one of the outputs of, respectively, the n m×m couplers and the N outputs of the m n×n routers being the outputs of the N×N router.

Each of the n×n routers is capable of switching an optical signal having a wavelength, from any one of its n inputs to any one of its n outputs, according to the wavelength of the signal, the n×n router having a transmission spectrum according to the wavelength in the form of a series of peaks.

The series of peaks of the m n×n routers are different one from the other.

What is called the transmission spectrum of an optical router is the spectral distribution of the luminous flux at its outputs that is produced by a luminous flux of a spectrum extended over the whole operational band of the router applied to the set of its inputs.

The router according to the invention uses different spectra according to different n×n routers that make selection possible depending on the wavelength, for a given input, of the n×n router concerned and within it, of the output channel aimed. This device does not require any time division multiplexing at all and allows use, upstream of the n×n routers, of a simple channel switching assembly such as that claimed.

In its totality, the N×N router can accommodate a transmission spectrum in the form of a series of peaks with the peaks very close together. For a given range of usable wavelengths, the number N of inputs and outputs can be significantly increased, without risk of optical cross-talk and with no specific technical problem.

Furthermore, the ratio R for the overall transmission spectrum can be considerably increased. The relative broadening of the width of the peaks then allows a less precise selection of emission wavelengths than in existing devices.

The greater the number of n×n routers is, the closer the peaks of the spectrum can be provided, but at the price of increasing the complexity of the assembly.

Preferably, the series of peaks from m n×n routers have peaks included within the intercalated bands.

This configuration allows to obtain overall a transmission spectrum comprising extra bands arising from different n×n routers. This can be particularly advantageous when the transmission wavelengths are regrouped in packs in each of the n×n routers.

In an advantageous embodiment of this configuration, the series of peaks from the m n×n routers have their peaks intercalated.

In this case, the peaks of the overall transmission spectrum alternatively result from a distinct n×n router, which means that, compared with each of the n×n routers taken in isolation, the closer the peaks are together the greater is the number of n×n routers. The ratio R can then be multiplied by m.

In an advantageous embodiment, the peaks of the m n×n routers have peaks which are completely dissociated.

The peaks of the entire transmission spectrum can then be clearly distinguished from one another whilst being very close together. Overlapping of peaks coming from different spectra of the n×n routers are however also possible.

According to a first embodiment of the N×N router, each of the m×m couplers is an achromatic coupler with uniform distribution of energy between its outputs.

In that way, the usual low cost elements are used.

According to a second embodiment, each of the m×m couplers is a wavelength distribution coupler capable of transmitting the energy of an optical signal having a wavelength, only through the output of the m×m coupler connected to the n×n router whose series of peaks includes that wavelength.

This second embodiment is advantageous in that it avoids any energy loss due to the m×m couplers, by channelling the signals, upstream from the n×n routers, in relation to the wavelength of the optical signal.

In a preferred embodiment of the N×N router, the m×m couplers are made up of 2×2 couplers, each having two inputs and two outputs.

Such 2×2 couplers, also called X couplers, are elements currently available and easily usable in association.

In this preferred embodiment, the N×N router advantageously includes a first level of 2×2 couplers whose inputs are the inputs of the N×N router, and a final level of 2×2 couplers whose outputs are connected to the inputs of the n×n routers. The inputs of the 2×2 couplers that do not form part of the first level, are connected to the outputs of the 2×2 couplers, and the outputs of the 2×2 couplers that do not form part of the final level, are connected to the inputs of the 2×2 couplers.

It is interesting that the N×N router comprises Y couplers, each having a main arm and two secondary arms, the inputs and the outputs of the N×N router being connected to the main arms of the Y couplers. The N×N router allows the sending of optical signals simultaneously from its inputs to its outputs and from its outputs to its inputs, the optical signals circulating in opposite directions in the two secondary arms of each of the Y couplers.

This latter device allows one to increase by a factor of 2 the number of inputs and outputs available, since a single wavelength allows communications in one direction and in the other direction of the N×N router. The characteristic claimed then contributes to increasing the number of users of a transmission system in a simple way.

Preferably, each of the n×n routers comprises:

a transmission medium including a first row of n inputs and a second row of n outputs, the first and second rows being arranged in parallel and the transmission medium having a planar transmission surface, a diffracting element positioned opposite said transmission surface a focusing lens located between the transmission medium and the diffracting element, the diffracting element and the focusing lens being capable of producing, from any one of the inputs, an image corresponding to any one of the outputs, according to the wavelength of said optical signals.

This configuration of n×n routers is both compact and economic.

The objective of the invention is also a method of optical routing implemented by means of an N×N router according to the invention. In this method, optical signals, each having a wavelength are sent from the inputs of the N×N router to its outputs.

The method according to the invention is characterized in that to be able simultaneously to send optical signals from at least two of the m inputs from at least one of the n m×m couplers, in the direction of the same of the N outputs of the N×N router without risk of interference, the optical signals have wavelengths which are distinct from one another.

Hence, the coupling of the input signals in the m×m coupler concerned does not prevent discrimination of these signals at the output of the N×N router.

According to a first preferred embodiment of implementing this method, the output of the N×N router, being one of the n outputs of one of the m n×n routers and the series of peaks of the n×n router having peaks, the wavelengths of the optical signals are distributed within one of the peaks.

According to a second preferred embodiment of implementing this method, the wavelengths of the optical signals have distinct orders.

The invention also relates to a communication network which comprises at least one N×N router having any one of the preceding features, or several of them in association, or which implements any one of the preceding features of the routing method.

BRIEF DESCRIPTION OF THE DRAWINGS

The invention will be better understood by referring to particular applications given for information purposes only and represented by the following appended drawings.

DETAILED DESCRIPTION OF THE PREFERRED EMBODIMENT

Figures 1A, 1B:
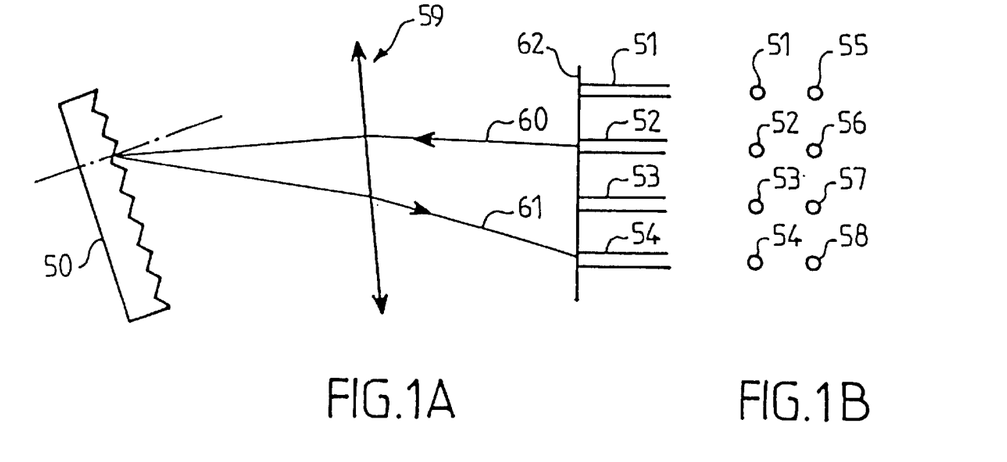
FIGS. 1A and 1B are diagrammatic representations of a 4×4 wavelength router used in an N×N router according to the invention, FIG. 1A showing a general plan of the 4×4 router and FIG. 1B, a front elevation of its plane of fibres.

An elementary 4×4 router, used in an N×N router according to the invention, comprises a diffraction grating 50 positioned opposite a plane 62 of fibres, such as may be seen in FIG. 1A. The 4×4 router also comprises a focusing device such as a lens 59. Input fibres 51, 52, 53, 54 terminate at the plane 62 of fibres being arranged in line, in the same way as output fibres 55, 56, 57, 58, the plane 62 of fibres being shown in front elevation in FIG. 1B. The input fibres 51–54 are arranged parallel with the output fibres 55–58 and opposite each other in the plane 62. The grating 50 is capable of producing, from any one of the input fibres 51–54, an image positioned in a focal plane which corresponds to any one of the output fibres 55–58 according to the wavelength. An incident ray 60 containing information transmitted by one of the input fibres arising from a transmitting user is thereby converted to a ray 61 returned by means of the lens 59 and the grating 50 which is directed to a receiving user by one of the output fibres. Depending on the wavelength of the emitted signal, any one of the four transmitting users can communicate with any one of the four receiving users.

The equations which give the wavelengths which allow passage from any one of the input fibres to any one of the output fibres can be shown schematically in a 4×4 matrix of the type shown below. The rows correspond to the input fibres 51–54 and the columns to the output fibres 55–58. The whole set of communications through the 4×4 router requires 7 wavelengths $\lambda_i$ where i varies from 1 to 7, arranged in a diagonal way.

|   | 1 | 2 | 3 | 4 |
|---|---|---|---|---|
| 1 | $\lambda_7$ | $\lambda_6$ | $\lambda_5$ | $\lambda_4$ |
| 2 | $\lambda_6$ | $\lambda_5$ | $\lambda_4$ | $\lambda_3$ |
| 3 | $\lambda_5$ | $\lambda_4$ | $\lambda_3$ | $\lambda_2$ |
| 4 | $\lambda_4$ | $\lambda_3$ | $\lambda_2$ | $\lambda_1$ |

The creation of an elementary n×n router, similar to that described, with any value of n, can be drawn up as for the 4×4 router. In this case, if the fibres are identical and evenly spaced, 2n−1 transmission wavelengths are necessary.

The diffraction grating 50 can be replaced by or complemented with an assembly of multi-dielectric filters or even by a phased array grating. A Michelson echelon, very efficient for raised orders of wavelengths can also be employed.

Furthermore, in place of fibres, one or several linear arrays of lasers can be employed as switching devices on input, and one or several photodetectors as receiving means on output.

A single linear array of input and output fibres can also be used.

In one particular embodiment of an n×n router, this includes a mirror and a diffraction grating, the mirror, the grating and the fibres being fixed in a solid block of silica. A linear array of input fibres and a linear array of parallel output fibres are positioned opposite a slit photo-engraved on a planar reflection grating, perpendicular to the grooves. A concave mirror is capable of converting a divergent beam coming from any one of the input fibres into a parallel beam. The grating is, for its part, capable of converting this beam by dispersing it angularly towards the concave mirror. This beam then has an image formed at one end of one of the output fibres in a position that depends on the wavelength. This configuration is aplanetic, afocal and has an amplification of 1. Hence all angles from and to the fibres being identical, the best conditions are obtained with large coupling efficiency, the achromatism is perfect and the aberrations are practically zero when the mirror is parabolic.

For the calculation of specifications, the grating is advantageously in a Littrow configuration. Furthermore, an OP (out of plane) configuration is preferably used, in order to avoid a direct reflection to an optical amplifier located at a short distance. In this configuration, the component uses a linear array of input fibres at the focal point of the dispersive grating device in such a way that no light whatsoever can be coupled directly to the output fibres at a wavelength corresponding to a Littrow condition. For this, the linear array of output fibres is positioned above the array of input fibres.

Figure 2:
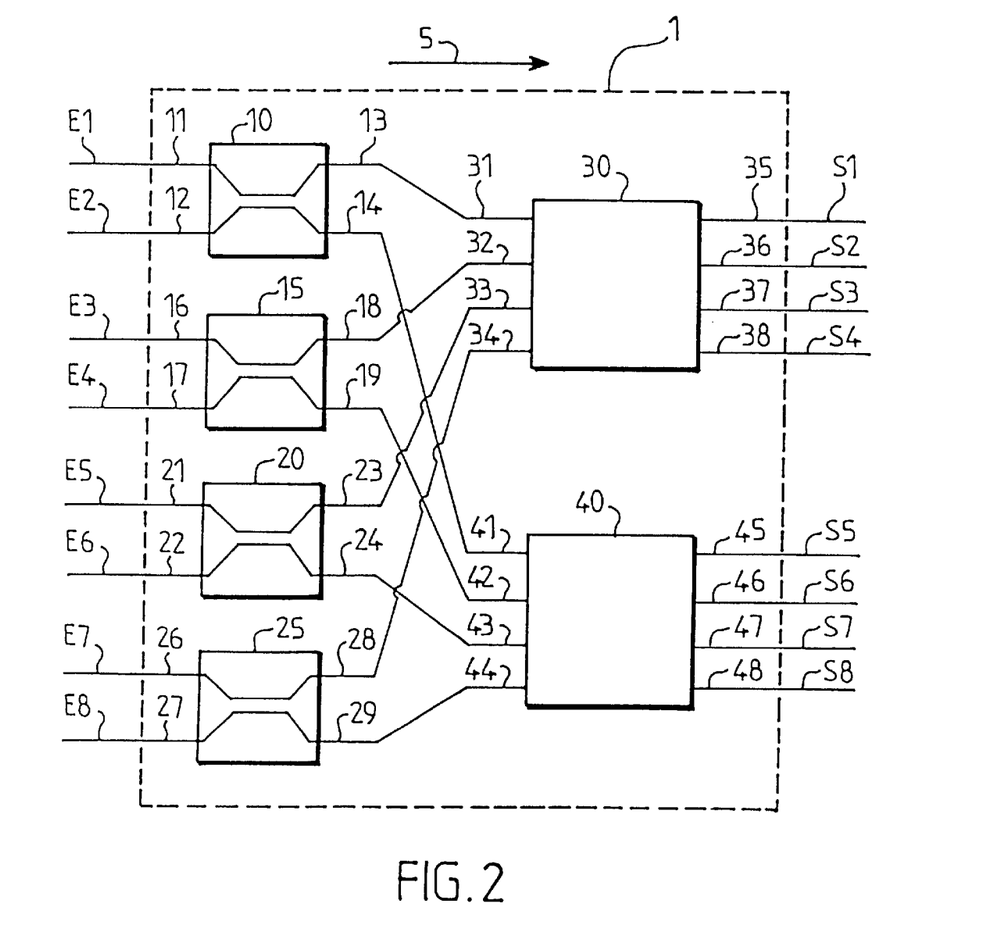
FIG. 2 represents an 8×8 wavelength router according to the invention, which comprises four 2×2 couplers and two 4×4 routers such as the one shown diagrammatically in FIGS. 1A and 1B.

An 8×8 router, reference number 1, corresponding to the invention, shown in FIG. 2, comprises eight inputs E1–E8 and eight outputs S1–S8. This 8×8 router is intended to transmit optical signals from any one input $E_i$ to any one output $S_i$ in direction 5, the path of the optical signal being determined by its wavelength. The router 1 comprises two 4×4 routers designated 30 and 40 respectively which are 4×4 routers such as the kind previously described (FIGS. 1A and 1B). It is also possible to use traditional 4×4 routers. The routers 30 and 40 each respectively comprise four inputs 31–34 and 41–44, and four outputs 35–38 and 45–48. The outputs 35–38, 45–48 from the routers 30 and 40 lead directly to the outputs S1–S8 of router 1.

Router 1 also comprises four achromatic X couplers, reference numbers 10, 15, 20, 25 each having respectively two inputs 11, 12; 16, 17; 21, 22; and 26, 27 and two outputs 13, 14; 18, 19; 23, 24; and 28, 29. The inputs 11, 12; 16, 17; 21, 22; and 26, 27 of the X couplers 10, 15, 20, 25 correspond respectively to the inputs E1–E8 of router 1. Each of the couplers 10, 15, 20, 25 has, furthermore, one of its outputs, respectively 13, 18, 23, 28 connected to one of the inputs respectively 31, 32, 33, 34, of a first router 30, and its other output, respectively 14, 19, 24, 29, connected to one of the inputs respectively 41, 42, 43, 44, of the second router 40.

Figure 3:
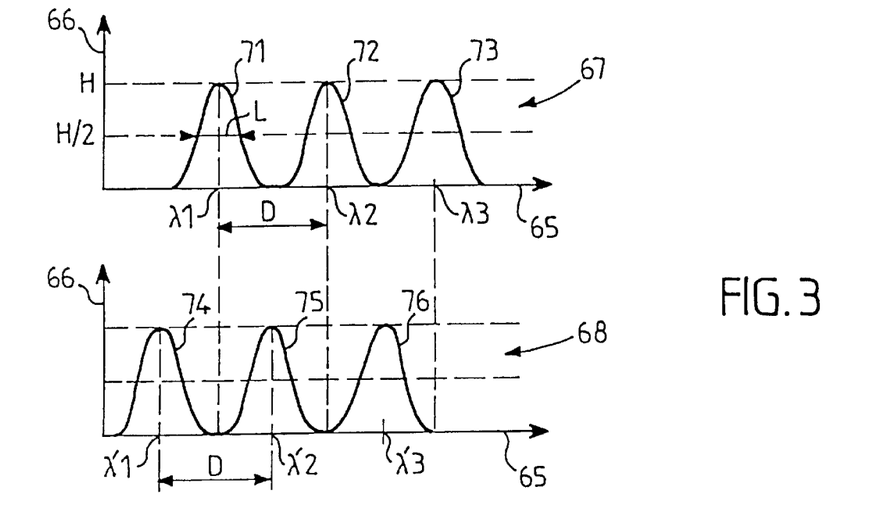
FIG. 3 shows the respective transmission spectra of the two 4×4 routers of the 8×8 router in FIG. 2.

The respective transmission spectra 67 and 68 of routers 30 and 40, shown in FIG. 3 are in the form of series of peaks with the peaks, respectively 71–73 and 74–76. The spectra 67 and 68 drawn according to axes 65 and 66, respectively of wavelengths λ and transmission T, have their peaks 71–76 centred on the transmission wavelengths of the routers 30 and 40. By taking the correspondence matrix previously given, the peaks 71, 72 and 73 of spectrum 67 are, for example, respectively centred on the wavelengths $\lambda_1$ $\lambda_2$ $\lambda_3$, the wavelengths $\lambda_i$ being arranged in a diagonal sequence. In a similar way, the peaks 74, 75 and 76 of spectrum 68 are centred on the wavelengths $\lambda'_1$ $\lambda'_2$ $\lambda'_3$.

In the example embodiment, the peaks 71–76 have approximately identical heights equal to H. Particular features of spectra 67 and 68 are the widths L of the peaks 71–76 at mid height H/2 and the spacing D between the successive transmission wavelengths $\lambda_i$. In a first approximation, the full width half maximum are similar for all of the peaks, as are the spacings D. The ratio R=L/D is significant for the capacities of the routers 30 and 40. The greater this ratio is, the more the processing capacities of the routers 30 and 40 are increased.

The routers 30 and 40 are chosen in such a way that their transmission wavelengths $\lambda_i$ and $\lambda'_i$ are intercalated. Hence:

$$\lambda'_1 < \lambda_1 < \lambda'_2 < \lambda_2 < \lambda'_3 < \lambda_3$$

When in operation, a signal at a given wavelength arrives at any one of the $E_i$ inputs of router 1, then at one of the couplers 10, 15, 20, 25. The signal is then transmitted to two outputs of this coupler with an energy divided by two for each one, the couplers being achromatic. The optical signal thus arrives at one input of each of the routers 30, 40. Given that the wavelength of the signal corresponds to a transmission wavelength of only one of the spectra 67, 68 of the routers 30, 40, the signal is only transmitted in this router, to the appropriate output chosen in relation to the wavelength. The output aimed for $S_j$ is then reached by the signal.

Router 1 therefore has at its disposal an overall transmission spectrum which accepts jointly the peaks 71–76 of the two spectra 67 and 68 of the routers 30 and 40. At a constant full width half maximum, equal to L, the spacing D between transmission wavelengths is thus significantly reduced, this reduction being able to be as much as a factor of 2. For a given available spectral band, the number of transmission wavelengths can therefore be multiplied by two, and consequently also the number of users. The ratio R can itself be multiplied by 2, which makes the selection of a transmission wavelength easier.

Figure 4:
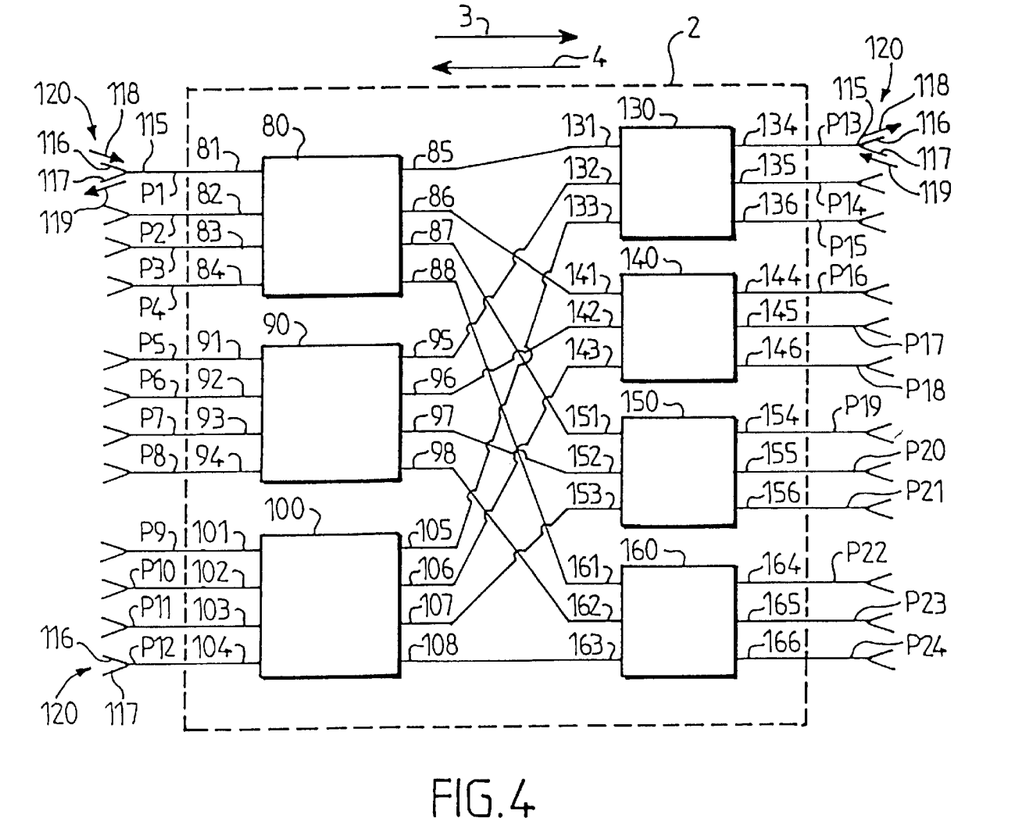
FIG. 4 is a diagrammatic representation of a 12×12 wavelength router according to the invention, comprising three 4×4 couplers and four 3×3 routers and with two way transmission.

A second example of creating an N×N router according to the invention is provided by a 12×12 wavelength router, reference number 2, shown in FIG. 4. This router comprises twelve inputs P1–P12 and twelve outputs P13–P24. It also comprises four 3×3 wavelength routers, reference numbers 130, 140, 150, 160, each having respectively three inputs 131–133, 141–143, 151–153, 161–163 and three outputs 134–136, 144–146, 154–156 and 164–166. The outputs of the routers 130, 140, 150, 160 correspond respectively to the outputs P13–P24 of router 2.

Router 2 also comprises three achromatic 4×4 couplers, reference numbers 80, 90 and 100. These couplers each have four inputs, respectively 81–84, 91–94 and 101–104 and four outputs, respectively 85–88, 95–98 and 105–108. The inputs of couplers 80, 90, 100 correspond respectively to the inputs P1–P12 of router 2, and the four outputs of each of couplers 80, 90, 100 are each connected to one input of one of the routers 130, 140, 150, 160.

Figure 5:
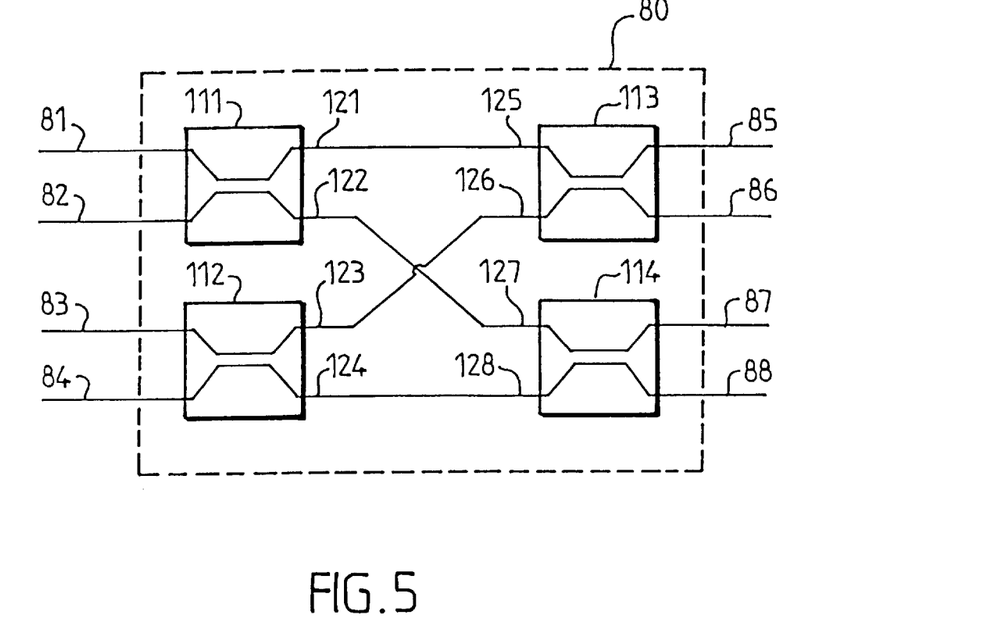
FIG. 5 is a detailed view of one of the 4×4 couplers of the 12×12 router in FIG. 4.

Each of the couplers 80, 90, 100 is, in reality, made up from four X couplers. Hence, as may be seen in FIG. 5, the coupler 80 comprises four 2×2 couplers reference numbers 111–114 each having two inputs, respectively 81, 82; 83, 84; 125, 126; 127, 128 and two outputs, respectively 121, 122; 123, 124; 85, 86; 87, 88. Two of the X couplers, 111, 112, are arranged on a first level, their inputs 81–84 being those of coupler 80. The two other X couplers 113 and 114, are arranged on a second level, their outputs 85–88 being those of coupler 80. Furthermore, the outputs 121–124 of each of the two couplers 111, 112 of the first level are each connected to an input 125–128 of one of the couplers 113, 114 on the second level. The two other 4×4 couplers, 90 and 100, are produced in a similar way.

Router 2 comprises, moreover, 24 achromatic Y couplers, reference numbers 120, each of them having a main arm 115 and two secondary arms 116 and 117. Each of the inputs P1–P12 and the outputs P13–P24 of router 2 is connected to the main arm 115 of one of the Y couplers 120. The couplers 120 are intended to be used as transmission means with two propagation directions, the two branches 116, 117 of each of the couplers 120 being provided for opposite signal propagation directions 118, 119. The router 2 is thereby intended for transmitting signals both in a direction 3 from inputs P1–P12 to the outputs P13–P24 and in an opposite direction 4.

Figure 6:
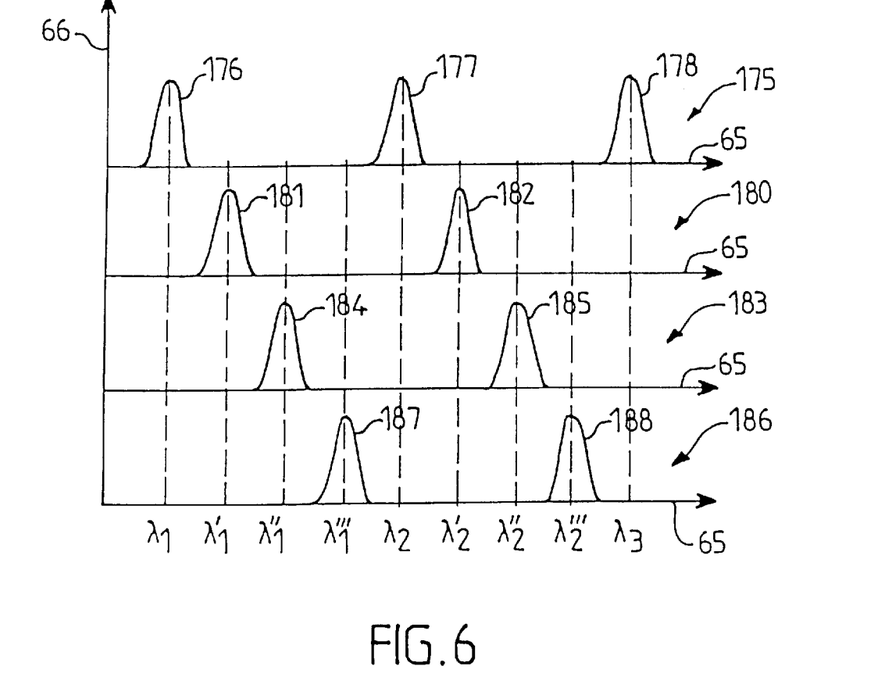
FIG. 6 shows the respective transmission spectra of the four 3×3 routers of the 12×12 router in FIG. 4.

The routers 130, 140, 150, 160 have transmission spectra 175, 180, 183, 186 having a series of peaks, respectively 176–178; 181, 182; 184, 185; 187, 188, centred on wavelengths $\lambda_1, \lambda_2, \lambda_3; \lambda'_1, \lambda'_2; \lambda''_1, \lambda''_2; \lambda'''_1, \lambda'''_2$.

The peaks of the four spectra 175, 180, 183, 186 of routers 130, 140, 150, 160 are alternated, that is to say that one has $$\lambda_1 < \lambda'_1 < \lambda''_1 < \lambda'''_1 < \lambda_2 < \lambda'_2 < \lambda''_2 < \lambda'''_2 < \lambda_3$$

In operation, a signal at a given wavelength reaches one of the inputs of one of the couplers 80, 90 or 100 and is transmitted to four outputs of this 4×4 coupler with energy reduced by a factor of 4. The optical signal is hence transmitted to one input of each of four routers 130, 140, 150, 160. Given that the wavelength of the signal is only one transmission wavelength of only one of the spectra 175, 180, 183, 186 of the 3×3 routers, the transmission of the signal only takes place in this router to the output selected in relation to the wavelength of the signal.

The router 2 thus has a general transmission spectrum having the set of peaks 176–178, 181, 182, 184, 185, 187, 188 of the spectra 175, 180, 183, 186 of the four routers 130, 140, 150, 160. The full width half maximum of the peaks is thereby conserved and the spacing between transmission wavelengths significantly reduced, this reduction possibly reaching a factor of 4. Furthermore, signals can simultaneously reach outputs P13–P24 and get to inputs P1–P12, according to the same principle. Just one wavelength can hence be used in both communication directions between two users, which multiplies by 2 the capacity of router 2.

The energy losses of routers 1 and 2 are low, corresponding respectively to factors of the order of 2 and of 4. The presence of optical amplifiers in the switching devices allows one to compensate for the effects of these losses. It is however possible to make the losses due to the couplers negligible, by associating the couplers with the wavelength selection means. These means can be obtained, for example, by a two wave interferometer, such as a Michelson interferometer, which can be arranged in an integrated optical wafer. In this case, the optical signal leaving one of the couplers is only transmitted selectively towards the router having a transmission wavelength corresponding to the wavelength of the signal.

Although the distinct peaks of the n×n routers have been shown as dissociated, they can equally well overlap, the important point being the centring of each of the peaks on one given transmission wavelength. In the examples illustrated, spectra are shown where the peaks from different routers are intercalated. However, any other means of obtaining complementary overlepping of the spectrum can be suitable. In particular, alternating spectral components from one router to another can involve bands and no longer peaks, each band comprising several peaks. This latter configuration is advantageous particularly if the spacing between transmission wavelengths is irregular, the peaks being grouped together in packs.

It is conceivable that the 4×4 and 3×3 elementary routers respectively used in routers 1 and 2 could be themselves routers according to the invention.

This possibility proves to be interesting, above all, for a higher number n of inputs and outputs, the invention being applicable in a cascade over two levels or more.

An improved version of the routing method implemented with the N×N router of the invention can be produced.

Considering, for example, the router 1 previously described (FIG. 2), it is desirable that several amongst any of the inputs E1–E8 can communicate simultaneously with the same of the outputs S1–S8. In the basic version previously explained, the transmission of signals coming from two inputs associated with one and the same 2×2 coupler, for example the inputs E1 and E2 and the coupler 10, and directed to one and the same output, for example S1, causes interference between the two signals.

Figure 7:
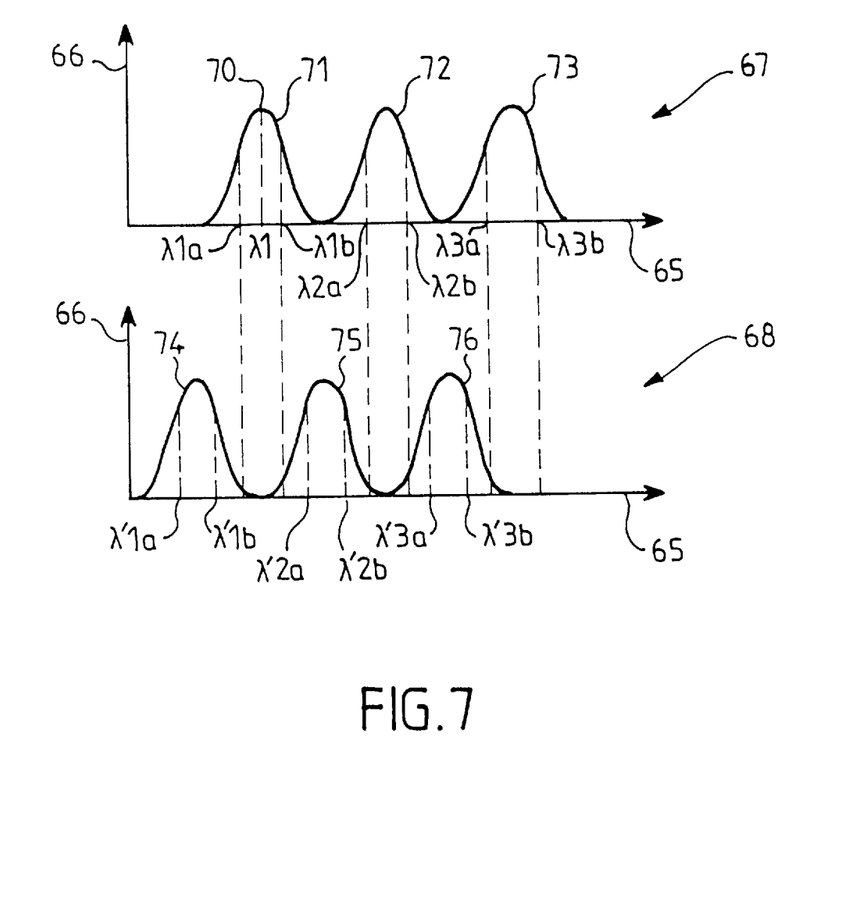
FIG. 7 shows the respective transmission spectra of the two 4×4 routers of the 8×8 router in FIG. 2, and represents the wavelengths of the signals transmitted in a preferred embodiment of implementing the routing method.

To remedy it, a first mode of implementation consists of sending, respectively to E1 and E2, signals having distinct wavelengths, but located on one and the same peak of the transmission spectrum 67 of router 30, as shown in FIG. 7. Hence, if the peak 71 of spectrum 67 corresponds to one optical path of input 31 of router 30 to the output S1, the wavelength for E1 has the value $\lambda_{1a}$ and that for E2, $\lambda_{1b}$. The wavelengths $\lambda_{1a}$ and $\lambda_{1b}$ are arranged in a way that produces preferably raised transmission amplitudes on peak 71, that is to say, amplitudes close to the maximum value 70 approximately reached for the mean wavelength $\lambda_1$ on which the peak 71 is centred. The wavelengths $\lambda_{1a}$ and $\lambda_{1b}$ are therefore preferably close to $\lambda_1$. Furthermore, they are advantageously symmetrical in relation to $\lambda_1$ in such a way that the corresponding transmission amplitudes are equal or close.

Thanks to this dissociation of the wavelengths of signals sent on E1 and E2, the signals received simultaneously on S1 from E1 and E2 can be reconstituted by separation of the wavelengths $\lambda_{1a}$ and $\lambda_{1b}$. This separation can, for example, be achieved by means of a coherent detection filter.

It is clear that the same mode of implementation is applicable to all of the inputs E1–E8 of router 1, by systematic dissociation of the two wavelengths corresponding respectively to the two inputs of each of the 2×2 couplers, 10, 15, 20, 25, and to one of the peaks 71–76 of one of the spectra 67, 68, according to the output S1–S8 aimed for.

According to a second mode of implementing the routing method, in order to simultaneously send signals from E1 and E2 to S1, two wavelengths with distinct orders are chosen respectively, that both allow the signals to be directed from input 31 of router 30 to its output 35.

In practice, high orders are necessary which makes the presence of a Michelson echelon in router 30 an advantage.

This same mode of implementation is, like the first one, applicable to all the inputs E1–E8, it also being possible to combine the two modes. For example, one or the other can be used according to the peaks in the spectrum.

The method of routing described, which consists of sending to the inputs of one single coupler signals with distinct wavelengths, in order to transmit them simultaneously to one and the same output of the N×N router, is also valid for when m is greater than 2.

For example, in the router 2 described previously (FIG. 4), one can simultaneously send signals from four inputs P1–P4 associated with one coupler 80 to the same output P13 of router 2. To do this, the four signals corresponding respectively to the four inputs P1–P4 have distinct wavelengths.

In the first mode of implementation, the four wavelengths are distributed within the peak of the spectrum 175 associated with the transmission of a signal from the input 131 of router 130 to its output 134, this peak being, for example, the one with reference number 176. The four wavelengths are advantageously positioned close to $\lambda_1$ and are symmetrical with respect to it.

In the second mode of implementation, they have distinct orders.

Of course, it is possible that only one part of the four inputs P1–P4 receives signals simultaneously, in the direction of the output P13.

Luminous sources connected to the inputs P1–P12 of router 2 and the detection means connected to the outputs P13–P24 are however, preferably provided respectively in order to transmit and automatically detect signals at distinct wavelengths defined in the selected routing method, which allows recognition of signals in all the cases.

The router of the invention can be produced in optical fibre based technology or in integrated optics.

The N×N router of the invention can be the object of partial implementation, only a part of its N inputs being used to receive optical signals. The number of the N inputs effectively in service being equal to M, where M<N, the N×N router behaves then as an M×N router.

EXAMPLE 1

In this first application example, the router according to the invention is a 40×40 router including two 20×20 routers and 20 achromatic X couplers. Each of the 20×20 routers corresponds to a component made in silica, with a focal length of 119.512 mm, a grating of 600 lines/mm, with a fibre holder with a double linear array of fibres spaced 42.54 µm apart. The first router is autocollimated to the centre of the field for 1548.5145 nm, and the second router has a spectrum displaced a half period thanks to autocollimation at 1548.5145±0.4 nm. A double linear array of 20 fibres equally spaced is positioned at the focus.

The transmission wavelengths of the first 20×20 router go from 1533.2 nm to 1563.9 nm with a spacing between transmission wavelengths of 0.8 nm.

The spectra of the 20×20 routers are such that the full width half maximum of the peaks, which have approximately a Gaussian shape, is 0.25 nm±0.02 nm. Furthermore, the 20×20 routers have the following properties:

losses of 4 dB±1 dB
intrinsic optical crosstalk<−55 dB from one channel to another;
return loss<−25 dB
polarisation sensitivity<1 dB
pulse broadening due to the grating equal to 38.6 ps;
precision of the wavelength channel: ±0.05 nm.

The spacing between transmission wavelengths (being 0.8 nm) is chosen to be constant, which avoids additional losses that could reach 3 dB.

The 20×20 routers are compatible with throughput rates of 10 Gbit/second on each channel.

The 20×20 wavelength matrix of the first 20×20 router has been calculated, taking into account the exact index of silica of each wavelength by making an iterative adjustment to the reference values. The matrix obtained is shown in the Appendix, the 20 columns corresponding to the inputs, and the 20 rows to the outputs. The values shown are expressed in nm. The adjustment error is less than 0.008 nm, which is negligible.

EXAMPLE 2

A 80×80 router comprises two 40×40 routers and 40 achromatic X couplers.

The 40×40 routers verify the specifications which follow:
spacing between transmission wavelengths: 0.4 nm
full width half maximum of the peaks: 0.25 nm±0.03 nm
losses<7 dB±2 dB;
optical crosstalk from one channel to another<−60 dB These 40×40 routers are compatible with throughputs of 10 Gbit/second on each channel.

EXAMPLE 3

A 6×6 router comprises two 3×3 routers produced with the help of 6 multiplexers, each made in shared optical function technology with a focal length 119.512 mm, space between fibres 32 μm and a grating of 300 lines/mm.

The multiplexers of the first 3×3 router are associated with the wavelengths 1552.517 nm, 1550.916 nm and 1549.315 nm. Those of the second 3×3 router to the same wavelengths displaced by ±0.8 nm.

The 6×6 router also comprises 3×3 couplers produced with fused fibre technology.

APPENDIX

I claim:

1. An N×N wavelength router comprising:

N inputs and N outputs which are provided to transmit optical signals, each optical signal having a wavelength, from the N inputs to the N outputs; and switching means for directing each of the optical signals from any one of the N inputs to any one of the N outputs according to the wavelength of said optical signal, wherein the switching means includes n m×m couplers each having m inputs and m outputs, N being equal to n×m and the N inputs of the n m×m couplers being the inputs of the N×N router, and m n×n routers each having n inputs and n outputs, each of said n inputs being connected to one of the outputs of, respectively, the n m×m couplers and the N outputs of the m n×n routers being the outputs of the N×N router, each of the n×n routers being capable of switching the optical signal having the wavelength from any one of its n inputs to any one of its n outputs, according to the wavelength of said optical signal, said n×n router having a transmission spectrum according to the wavelength in a form of a series of peaks, the series of peaks from the m n×n routers being different from one another.

2. An N×N router according to claim 1, wherein the series of peaks of the m n×n routers have peaks included in intercalated bands.

3. An N×N router according to claim 2, wherein the series of peaks of the m n×n routers have their peaks intercalated.

4. An N×N router according to claim 1, wherein the series of peaks of the m n×n routers have peaks which are completely dissociated.

5. An N×N router according to claim 1, wherein each of the m×m couplers is an achromatic coupler with uniform distribution of energy between the outputs thereof.

6. An N×N router according to claim 1, wherein each of the m×m couplers is a wavelength distribution coupler capable of transmitting the energy of an optical signal having a wavelength, only through the output of said m×m coupler connected to the n×n router whose series of peaks includes said wavelength.

7. An N×N router according to claim 1, wherein the m×m couplers are made up of 2×2 couplers, each having two inputs and two outputs.

8. An N×N router according to claim 1, wherein it comprises Y couplers each having a main arm and two secondary arms, the inputs and the outputs of the N×N router being connected to the main arms of said Y couplers, said N×N router allowing the sending of optical signals simultaneously from its inputs to its outputs and from its outputs to its inputs, said optical signals circulating in opposite directions in the two secondary arms of each of the Y couplers.

9. An N×N wavelength router, comprising:

N inputs and N outputs which are provided to transmit optical signals, each optical signal having a wavelength, from the N inputs to the N outputs; and switching means for directing each of the optical signals from any one of the N inputs to any one of the N outputs according to the wavelength of said optical signal, wherein the switching means includes n m×m couplers each having m inputs and m outputs, N being equal to n×m and the N inputs of the n m×m couplers being the inputs of the N×N router, and m n×n routers each having n inputs and n outputs, each of said n inputs being connected to one of the outputs of, respectively, the n m×m couplers and the N outputs of the m n×n routers being the outputs of the N×N router, each of the n×n routers being capable of switching the optical signal having the wavelength from any one of its n inputs to any one of its n outputs, according to the wavelength of said optical signal, said n×n router having a transmission spectrum according to the wavelength in a form of a series of peaks, the series of peaks from the m n×n routers being different from one another, wherein the m×m couplers are made up of 2×2 couplers, each having two inputs and two output, wherein a first level of 2×2 couplers has inputs which are the inputs of the N×N router, and a final level of 2×2 couplers has outputs which are connected to the inputs of the n×n routers, the inputs of the 2×2 couplers which do not belong to said first level being connected to the outputs of the 2×2 couplers and the outputs of the 2×2 couplers which do not belong to said final level being connected to the inputs of 2×2 couplers.

10. An N×N wavelength router comprising:

N inputs and N outputs which are provided to transmit optical signals, each optical signal having a wavelength, from the N inputs to the N outputs; and switching means for directing each of the optical signals from any one of the N inputs to any one of the N outputs according to the wavelength of said optical signal, wherein the switching means includes n m×m couplers each having m inputs and m outputs, N being equal to n×m and the N inputs of the n m×m couplers being the inputs of the N×N router, and m n×n routers each having n inputs and n outputs, each of said n inputs being connected to one of the outputs of, respectively, the n m×m couplers and the N outputs of the m n×n routers being the outputs of the N×N router, each of the n×n routers being capable of switching the optical signal having the wavelength from any one of its n inputs to any one of its n outputs, according to the wavelength of said optical signal, said n×n router having a transmission spectrum according to the wavelength in a form of a series of peaks, the series of peaks from the m n×n routers being different from one another, wherein each of the n×n routers comprises:

a transmission medium comprising a first row of n inputs and a second row of n outputs, the first and second rows being arranged in parallel and the transmission medium having a planar transmission surface, a diffracting element positioned opposite said transmission surface, a focusing lens positioned between the transmission medium and the diffracting element, the diffracting element and the focusing lens being capable of producing, from any one of the inputs, an image corresponding to any one of the outputs, according to the wavelength of said optical signals.

11. A method of optical routing carried out by means of an N×N router according to claim 1, wherein optical signals, each having a wavelength, are sent from the inputs of the N×N router to its outputs, wherein to be able to send optical signals simultaneously from at least two of the m inputs of at least one of the n m×m couplers in the direction of the same of N outputs of the N×N router without risk of interference, said optical signals have wavelengths which are distinct one from another.

12. A method of optical routing according to claim 11, wherein said output of the N×N router being one of n outputs from one of the m n×n routers and the series of peaks of said n×n router having peaks, the wavelengths of said optical signals are distributed within one of said peaks.

13. A method of optical routing according to claim 11, wherein the wavelengths of said optical signals have distinct orders.

14. A communication network comprising at least one N×N router according to claim 1 or implementing a routing method according to claim 11.

* * * * *